United States Patent [19]

Haggard et al.

[11] Patent Number: 4,599,776

[45] Date of Patent: Jul. 15, 1986

[54] ELEMENT REMOVAL TOOL FOR SYSTEM CARRYING FLUID UNDER PRESSURE

[76] Inventors: Eugene E. Haggard, 4259 N. Jerry Ave., Baldwin Park, Calif. 91706; John A. Correa, 3780 W. 177th St., Torrance, Calif. 90504; Terrell M. Keene, 808 S. Bradfield Ave., Compton, Calif. 90221; Wiley C. Calhoun, 13739 Mc Nab St., Bellflower, Calif. 90706; Edgar J. Flemming, 5742 S. Van Ness St., Los Angeles, Calif. 90062; David L. Taylor, 11249 Hulme Ave., Lynwood, Calif. 90262; Richard N. Hartley, 11600 Hollyview Dr., La Mirada, Calif. 90638; Francisco J. Martinez, 8348 Terradell St., Pico Rivera, Calif. 90660; Rudy A. Lopez, 10235 Hunt, Southgate, Calif. 90280

[21] Appl. No.: 663,564

[22] Filed: Oct. 22, 1984

[51] Int. Cl.[4] .............................................. B23P 19/04

[52] U.S. Cl. .................................. 29/213 R; 29/240; 81/55

[58] Field of Search .................. 29/213, 240; 137/317, 137/318, 319; 81/55

[56] References Cited

U.S. PATENT DOCUMENTS

| | | | |
|---|---|---|---|
| 1,736,561 | 11/1929 | Wattel | 29/213 |
| 3,644,982 | 2/1972 | Anderson | 29/213 |
| 3,773,067 | 11/1973 | Ray | 137/318 |
| 3,840,967 | 10/1974 | Olson | 29/213 |
| 3,889,558 | 6/1975 | Duncan | 81/55 |
| 4,329,892 | 5/1982 | Daigle | 81/55 |

*Primary Examiner*—James L. Jones, Jr.

*Attorney, Agent, or Firm*—Bruce L. Birchard

[57] ABSTRACT

An element removal tool for use with transmission lines for fluids (such as natural gas) under pressure which permits replacement of the element, in a specific case the axle box which is coupled between a metering chamber and the indexing mechanism in a gas meter, in a fluid transmission system, without shutting off downstream-customer service, the problem of properly seating the axle box in the undergear which drives it, despite slow rotation of the driving mechanism in the metering chamber, being overcome by dual concentric shafts relatively rotatable and slidable with respect to each other, the inner shaft carrying a socket which engages, firmly, the rotatable indexing shaft of the axle box, the outer shaft carrying a socket which is adapted to firmly engage the flange of the axle box for removal and replacement of the axle box, each shaft having at its end remote from its respective socket, a knob for rotating that shaft, the outer shaft passing through and hermetically engaging a stuffing box, connected to such stuffing box being a selectively operable valve for venting gas accumulated during the process of removing a defective axle box from the metering chamber, both inner and outer shafts being retractable into the stuffing box region of the tool so as to permit the closing of a gate valve between the stuffing box region and the base sealing unit of the tool, thus permitting removal of the shafts and the attached defective axle box from the tool and further permitting the replacement of a new axle box on the tool for a re-insertion in the metering chamber, the base sealing unit having transparent walls to assist in the process of orienting the shaft of a new axle box when it is being inserted in the metering chamber.

10 Claims, 2 Drawing Figures

ELEMENT REMOVAL TOOL FOR SYSTEM CARRYING FLUID UNDER PRESSURE

BACKGROUND OF THE INVENTION

1. Field of the Invention

This invention relates to the field of tools and more particularly to the field of specialized tools for maintaining transmission lines carrying volatile fluids under pressure.

2. The Prior Art

Here incorporated by reference is the prior patent specification entitled "Element Removal Tool For System Carrying Fluid Under Pressure" Ser. No. 06/565 636, filed Dec. 27, 1983. Described in that specification is a tool for replacing flow sensing elements, such as axle boxes, in transmission lines carrying fluid under pressure. The described tool includes a base sealing portion, a detachable stuffing box portion and an interposed gate valve. The tool also includes an element removal portion having a shaft and an attached socket adapted to engage the element to be replaced.

In using the described tool for element replacement, the shaft is first employed to extend the socket out past the base at which point the socket is engaged onto a defective element in a given transmission line. The composite tool is then brought down around the element and secured on the transmission line, thus creating a sealed chamber around the shaft and socket assembly and over the subject element. By means of the shaft and socket, the defective element is then disconnected from the transmission line. The shaft is then used to withdraw the socket and its engaged element into the stuffing box, after which the gate valve is closed. With the valve closed, the stuffing box may be detached from the base sealing portion without a depressurization of the transmission line. The detachment of the stuffing box exposes the withdrawn socket, thus enabling the engaged element to be removed from the socket.

For element replacement, the reverse process begins with a new element being inserted into the socket. The stuffing box is then reattached to the base sealing portion, the gate valve opened and the shaft employed to slide the socket and new element back into contact with the transmission line. After the element is then reinserted, the socket is disengaged and the overall tool removed from the pressurized line.

As more fully discussed in the incorporated specification, the subject tool represents a significant advance over previous replacement techniques in that whereas replacement previously required several hours of labor by several people under conditions involving a degree of physical danger, replacements using the new tool may now be accomplished with greater safety by a single operator in approximately 15 minutes.

Despite the significant advantages of the new tool, however, several difficulties have been encountered. These difficulties have been especially apparent in the typical operational environment where the element being replaced is the axle box of the gas flow meter. As will be further discussed below, such axle boxes include an indexing axle having an end portion denominated the "tail" which extends into the meter's gas flow chamber and which is adapted to be received into a companion mating receptacle in the meter's paddle-like activator portion, denominated the "undergear." During ordinary conditions where gas flow is sufficient to cause the activator paddle to rotate at some significant rate, the respective structures are configured such that the mating of the axle tail with the undergear receptacle is basically self-seating. When the gas flow is sufficient, therefore, proper indexing operation of a replacement axle box assembly may be achieved simply by bringing the new axle box into contact with the undergear. It has now been discovered, however, that where the gas flow is rather minimal, the undergear paddle, if still rotating at all, can slow to a rotation rate insufficient to induce the desired self-seating. Under these alternative conditions, therefore, the tail must be affirmatively brought into co-alignment with the undergear mating receptacle in order for seating to take place. For the tool in its existing form, the required co-alignment could be achieved only by resorting to various makeshift alignment practices of a clearly dissatisfying nature.

In addition, because the tool in general and the base sealing portion in particular is typically constructed of a solid metal material, the insertion of the replacement axle box into its associated mounting receptacle in the transmission line has been a "groping in the dark" type operation, further complicated by both the now discovered additional necessity of waiting until the overall tool is disconnected from the transmission line before being able to determine whether the indexing axle is properly engaged by virtue of the axle tail having been properly seated in its associated undergear receptacle.

It is accordingly a first object of the present invention to overcome the disadvantages of the prior art.

It is another object of the present invention to provide for the subject tools the capability of affirmatively aligning the tail of an indexing axle with an undergear mating receptacle during element replacement operations.

It is a further object of the present invention to provide for the subject tools the capability of monitoring the progress of replacement operations without having to remove an engaged tool from a subject transmission line.

SUMMARY OF THE INVENTION

The drawbacks of the prior art are overcome and hence the stated and other objects are achieved by the present invention which first generally provides the subject tools with a mechanism which in cooperation with a subject indexing axle enables the relative angular orientation of the axle to be selectively adjusted.

A more specific aspect of the invention focuses on the tool's axle box removal portion with its shaft and socket. With regard to the shaft, the invention further provides that the shaft take the form of a dual concentric shaft assembly having an outer shaft, an inner shaft rotatably mounted within the outer shaft and an orienting mechanism, such as a manually graspable shaft segment located external to the tool's base sealing and stuffing box portions. This orienting mechanism enables selective alterations in the angular orientation of the inner shaft with respect to remainder of the tool to be effectuated. With regard to the associated axle box removal socket, this aspect of the invention conjunctively provides that the socket take the dual form of an outer socket and an inner socket. The outer socket is connected to the outer shaft and is adapted to engage a subject axle box. The inner socket is connected to the inner shaft and is adapted to engage an associated indexing axle. For this more specific aspect of the invention, the inner shaft, the inner socket and the associated orienting mechanism thus together comprise for the subject invention a generic angular adjustment mechanism.

A still more specific aspect of the invention provides that the tool's base sealing portion include a transparent wall section which enables axle box removal operations to be observed from outside of the base sealing portion.

BRIEF DESCRIPTION OF THE DRAWINGS

This invention can best be understood by reviewing the description which follows in conjunction with the drawings herein in which.

DETAILED DESCRIPTION OF THE PREFERRED EMBODIMENT

Figure 1:
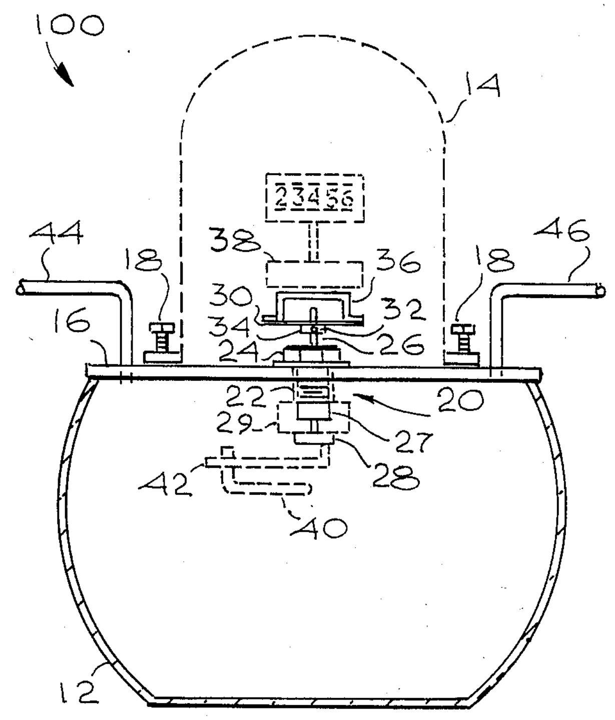
FIG. 1 is a diagrammatic representation of a metering structure in a transmission line for volatile fluids under pressure, to which the present invention is applicable; and, FIG. 2 is a diagrammatic representation of the improved tool assembly according to the present invention.

As generally discussed in the above-incorporated Specification, meter 100 FIG. 1 again includes a metering chamber 12 and a volume or pressure corrector, or index, 14 secured to the upper wall 16 by means of threaded bolts 18. Axle box 20 has a body portion 22 which is threaded and, an upper flange 24, which may be hexagonal in shape for ease of securing axle box 20 in upper wall 16 of metering chamber 12. An indexing shaft 26 runs coaxially through body 22. More specifically for purposes of the present invention, at the lower end of shaft 26 is secured a tail portion 27 adapted to be received into a mating receptacle of conventional, schematically-represented undergear 29. Interacting with undergear 29 is a paddle-like activator portion 28. At the upper end of shaft 26 there is a first wiggler 30 which is secured to shaft 26 by a set screw 32 and collar 34.

Wiggler 30 is designed to engage and cooperate with a driving member 36 which is a portion of either the indexing or volume and pressure correcting mechanism included in volume and pressure corrector or indexing portion 14 of meter 100.

In normal operation of meter 100, paddle 28 is caused to rotate or oscillate by elements 40 and 42 contained within the metering chamber 12. Inlet pipe 44 introduces the fluid or gas under pressure into metering chamber 12. Outlet pipe 46 passes the fluid under pressure to the user or the next measuring point. The specific structure for undergear 29 and its associated mating receptacle, as well as the actual mechanism for causing paddle 28 and hence the shaft 26 to which it is ultimately connected to oscillate or rotate are not part of this invention and need not be described here. Shaft 26 is carried in a plastic bushing with low-friction characteristics. Such material may be TEFLON. By reason of the rotation or oscillation of shaft 26 in the bushing material within axle box 20, the bushing material is worn and gradually leakage begins to occur around shaft 26. Thus, some of the fluid or gas under pressure in metering chamber 20 escapes around shaft 26 and reduces the accuracy of the metering step and further raises certain dangers because of the normal volatility of the gas or other fluid being transmitted through pipes 44, 46. Thus, it is necessary, from time-to-time, to replace axle box 20. As previously discussed, the tool of the incorporated Specification provides a means for replacing such axle boxes in a straightforward fashion without having to by-pass meter 100 with a rather elaborate network of pipes and fixtures.

Figure 2:
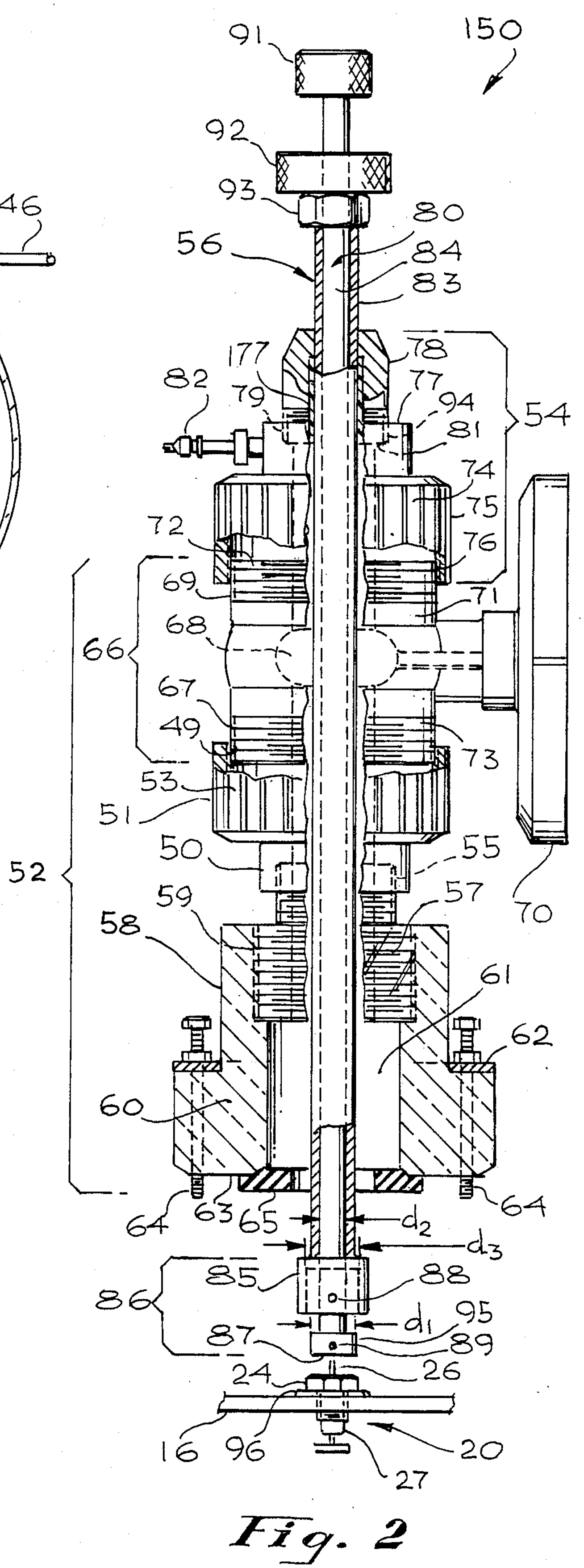

An improved version of this tool is shown in the present FIG. 2. As with the previous tool, the tool assembly 150 of the present figure generally includes a base sealing unit 52, a stuffing box unit 54 and an axle box removal unit 56. A central aspect of the present invention will be shown to involve the modified nature of this present removal unit 56.

Base sealing unit 52 includes a base portion 58 having a sealing flange section 60. Flange section 60 includes a metallic pressure plate 62 against which attachment screws 64 may be tightened. Base portion 58 also includes an axial core aperture 61 adapted to allow the passage of socket assembly 86. Sealing ring 65 surrounds the periphery of core aperture 61 at the bottom surface 63 of flange section 60. Base portion 58 carries interior threads 59 for receiving one end of threaded connecting member 57. The other end of member 57 is received into threads 55 of base intermediate member 50. Member 57 also contains an axial core aperture for the passage of socket assembly 86.

One aspect of the present invention provides that base portion 58, preferably in its entirety but at least a wall section, be composed of a transparent material such as a suitable clear plastic of conventional composition. The transparent nature of the material enables element replacement operations to be observed from outside of the base when the tool is attached to a subject near wall 16. For further convenience in replacement operations, connecting member 57 may also be composed of a similar transparent material.

Towards the upper end of base sealing unit 52 there is a gate-valve assembly 66 comprising a gate-valve element 68 adjustable in its position internally to cylinder 58 by means of knob 70 which, upon rotation, causes valve element 68 to move into central axial aperture 71 to block off the flow of fluids through the axial passageway. The construction of the gate-valve mechanism is well known and need not be explained here. It may be noted, however, that knob 70 is constructed to serve not only as a means for valve rotation but also as a handle for tool portability.

The lower end 73 of valve assembly 66 carries external threads 67 for mating with internal threads 49 of the rotatably mounted collar 51 of base intermediate member 50. Exterior facets 53 on member 50 are provided so as to improve the grip of an operator during tool assembling. The upper end 72 of valve assembly 66, and hence of base sealing unit 52, is externally threaded to receive stuffing box 54.

Stuffing box 54 includes stuffing intermediate member 74 having an externally faceted, rotatably mounted collar 75 with internal threads 76 at the lower end thereof, cooperating with the external threads 69 in the upper portion 72 of base sealing unit 52. Unit 54 also includes a stuffing collar 78 which is impervious to the gas or other fluid in the transmission system being maintained. However, it does have a central opening therethrough for the passage of the shaft portion 80 of axle removal unit 56. Stuffing collar 78, by means of a suitable expedient such as a plastic bushing 77 with low-friction characteristics, fits snugly about shaft 80 as it passes through collar 78. The lower end of collar 78 carries external threads 79 which are received into internal threads 94 of the top section 77 of stuffing intermediate member 74. Member 74, and hence stuffing box unit 54, includes, in addition, gas-release valve 82 which is selectively ventable for bleeding off gas or other fluid when gate-valve 66 is closed. When gate-valve 66 is open, release valve 82 is kept closed to prevent the escape to the atmosphere of the gas or other fluid being transmitted in the associated transmission system.

Stuffing intermediate member 74 and base 50 both contain axial core apertures which in conjunction with the companion apertures of base portion 58, connecting member 57 and gate-valve assembly 66 create a central chamber extending from the bottom surface 63 of base 58 to the bottom surface 81 of collar 78. It is through this chamber that socket assembly 86 may be drawn during replacement operations.

Axle box removal unit 56 includes shaft 80 at one end of which is socket assembly 86. A central aspect of the present invention provides that shaft 80 comprise a dual concentric shaft assembly having an inner shaft 84 rotatably mounted within an outer shaft 83. At one end of inner shaft 84 and hence disposed both external to stuffing collar 78 and outer shaft 83 is secured a knob 91 which is externally textured for manual grasping and rotation. Externally textured knob 92 is similarly secured to the external end of outer shaft 83. By grasping knobs 91 and 92 with opposite hands, an operator can alter the orientation of inner shaft 84 within outer shaft 83. Knob 91 thus provides an orientating mechanism which enables selective alterations in the relative orientation of the inner shaft with respect to the remainder of the tool to be effectuated. Outer shaft 83 also carries, at its exterior end adjacent to knob 92, a nut 93. Nut 93 provides a means by which mechanical leverage may be applied to outer shaft 83 so as to tighten or loosen axle boxes engaged in socket assembly 86 at the opposite end of the outer shaft 83.

Also accordance with this aspect of the invention, socket assembly 86 comprises an outer socket 85 and an inner socket 87. Outer socket 85 is connected to outer shaft 83 and is adapted to engage a subject mounting flange 24. Inner socket 87 is connected to inner shaft 84 and is adapted to engage a subject indexing axle 26. With inner socket 86 appropriately positioned with respect to outer socket 85 and with an indexing axle cooperatively engaged with an inner socket 87, the combination of inner socket 87 with inner shaft 84 and knob 81 thus together provides a mechanism which enables the relative angular orientation of axle 26, with respect to the remainder of the tool 150 in general and the base sealing portion 58 in particular.

Additional features of the dual shaft and associated socket assembly may also be noted. First, the outer shaft 83 and inner shaft 84 are respectively sized so that inner shaft 74 is adjustably axially slidable within outer shaft 83. Second, the socket end of inner shaft 84 is typically provided with a flange 95 having a transverse diameter $d_1$ which is greater than internal diameter $d_2$ of outer shaft 83 and yet smaller than internal diameter $d_3$ of outer socket 85. The outer socket's internal height, and internal diameter $d_3$ are chosen so that flange 95 and hence inner socket 87 may be withdrawn sufficiently far into socket 85 so that outer socket 85 may independently engage axle box flange 24 without the concurrent engagement of axle 26 within inner socket 87. The relative axial slideability of the two shafts, in combination with the appropriate dimensioning of the various socket numbers, thus provides the inner shaft 84 and its associated inner socket 87 with a selective engagement capability. Furthermore, the differential between external diameter $d_1$ of flange 95 and internal diameter $d_2$ of outer shaft 83 enables flange 95 to serve as a mechanism for preventing the inner shaft 84 from being axially blown out of the outer shaft 83 upon experiencing the pressure associated with the removal from a pressurized transmission line of an axle box 20. Third, the internal dimensions of outer socket 84 are selected so that an axle box flange 24 is firmly engaged by the outer socket 85 the degree of such firm engagement may be enhanced by the provision of set screw 88 which may be of the Allen-head variety. Inner socket 87 is internally dimensioned so as to snugly engage an indexing axle 26, with such snug engagement being enhanceable through the provision of a set screw 89.

The steps involved in utilizing the improved tool assembly 150 are as follows. First, index box or pressure corrector assembly 14 is removed by loosening studs 18. Wiggler 30 of axle box 20 is then easily decoupled from driving element 36 of the index box assembly 14. Next, wiggler 30 is removed from shaft 26 by loosening set screw 32. The axle box assembly is now slightly loosened so as to break the seal at the juncture of flange 24 with upper wall 16 of metering chamber 12. The purpose of this step is to make easier the use of the axle box removal unit 56.

Next, with tool 150 in its composite assembled conditioned, inner shaft 84 is slid along outer shaft 83 so that flange 95 is withdrawn up into outer socket 85 a sufficient distance so as to enable socket 85 to independently engage axle box flange 24 without the concurrent engagement by inner socket 87 of indexing axle 26. Outer socket 85 is now placed over axle box flange 24 and Allen-screw 88 is tightened so as to assure a good grip on flange 24.

The composite tool 150 is then dropped over socket assembly 86 and rotated until studs 64 line up with receiving threaded holes in the upper wall 16 of metering chamber 12. It may be noted parenthetically that this rotation may be facilitated by constructing flange section 60 so as to be rotatably coupled to base portion 58. The rotation may, however, be likewise achieved by simply rotating composite tool 150 in its entirely. Attachment screws 64 are now tightened, which brings sealing ring 65 into firm contact with the upper surface of wall 16 and blocks any flow of gas or other fluid out between wall 16 and the bottom surface 63 of flange section 60.

With knobs 91 and 92 being held so as to prevent uncontrolled upward movement of the concentric shaft assembly through the internal axial chamber of tool 150, outer shaft 83 is rotated so as to decouple axle box 20 from the upper wall 16 of metering chamber 12. Socket assembly 86 is then withdrawn up past the operative portion of gate-valve 66, at which point handle 70 is turned until gate-valve 66 is closed by reason of valve element 68 spanning the space between opposing sections of central axial aperture 71.

Before next decoupling stuffing box unit 54 from base sealing unit 52, it is preferable to bleed down any gas which is accumulated in stuffing unit 54. The bleed down is accomplished by depressing pressure release valve 82 so that any gas or other fluid may escape. The quantity of gas or fluid thus released will typically be very limited. Stuffing box unit 54 may now be decoupled from base sealing unit 52 by rotating collar 75 in an appropriate direction to cause internal threads 76 to disengage from external threads 69 in the upper portion 72 of base sealing unit 52. Stuffing box unit 54 carrying axle box removal unit 56 may now be taken aside and set screw 88 rotated so as to release axle box 20 from outer socket 85.

The procedure to be followed next is dependent upon the flow conditions within the subject transmission line. If the flow is of a predeterminably sufficient level so as to in duce self seating of axle box tail portion 27 upon insertion into undergear 29, flange 95 and hence inner socket 87 is maintained in its retracted condition within outer socket 85 and the flange of a replacement axle box 20 is simply secured within outer socket 85. If, however, the flow conditions are not thusly sufficient, or where an affirmative degree of control over indexing axle orientation is otherwise desired, flange 95 is pushed down out of outer socket 85 so as to enable inner socket 87 to engage the indexing axle 26 of a new axle box 20. Once the new indexing axle is engaged, outer socket 85 is then brought down so as to engage flange 24.

With the new axle box firmly gripped by socket assembly 86, and with a sealing washer 96 crimped so that it will stay on the threaded body of axle box 20, stuffing unit box 54 is recoupled to base sealing unit 52, with dual shaft assembly 80 still retracted. Gate-valve 66 is then opened and shaft 80, carrying in socket assembly 86 a new axle box, is pushed downward until the new axle box begins to engage the threaded opening provided for it in the upper wall 16 of metering chamber 12. Where the gas flow is sufficient to cause self seating of tail portion 27 within undergear 29, and hence where the indexing axle 26 has not been engaged within inner socket 87 of inner shaft 84, knob 92 may be employed to rotate outer shaft 83 and hence outer socket 85 so as to firmly seat axle box 20 in the appropriate opening in the upper wall 16. In contrast however, where conditions are such that indexing axle 26 has been snugly engaged by inner socket 87, the firm seating of axle box 20 is preceded by a rotation of knob 91 and hence of inner shaft 84 so as to cause engaged indexing axle 26 and hence tail portion 27 to be appropriately engaged with an undergear 29. Once this engagement is effectuated, the firm seating of axle box 20 is then achieved by rotation of knob 92 and hence of outer shaft 83.

With the new axle box firmly seated, further leakage of gas out of the metering chamber 12 is cut off so that the composite tool 150 may be bled down by opening pressure release valve 82. Screws 64 may then released, and joined base sealing unit 52 and stuffing box unit 54 may be lifted away from the upper wall 16 of metering chamber 12, thus exposing socket assembly 86. With the release of set screw 88, and if present set screw 89, socket assembly 86 may be disengaged from the new axle box 20. Following a final tightening of the new axle box assembly with appropriate implements such as a wrench, wiggler 30 and the remaining elements of corrector or index 14 may then be reapplied to shaft 26.

At this point the original apparatus, whether it be a standard index box assembly, a pressure corrector or any other element involved in the registration of pressure or flow and designated by numeral 14, is returned to its original position on the upper wall 16 of metering chamber 12, and the unit is now completely ready for operation in any normal fashion.

While this discussion has been primarily directed to the replacement of an axle box in a gas transmission line, the improved tool involved and described here, as with the prior tool of the incorporated specification, is equally applicable to other transmission systems where a fluid is being transmitted under pressure and there is some sensing element which invades the space where the fluid is flowing, on its one side, and is exposed to ambient air, on its other side.

While a particular embodiment of this invention has been shown and described, it will be apparent to those skilled in the art that variations and modifications may be made therein without departing from the spirit and scope of this invention. It is the purpose of the appended claims to cover all such variations and modifications.

What is claimed is:

1. A tool for replacing an axle box in a member such as a meter, or the like, in a gas distribution system carrying gas under pressure, such axle box having a mounting flange and a rotatable axle carried thereby, said member having a flat surface carrying said axle box, said flat surface having threaded openings proximate to the periphery thereof;

a base sealing portion including a first pipe having first and second ends, said first end carrying threads and said second end carrying a flange;

said flange on said second end of said first pipe having openings therein for passing threaded bolts therethrough, to engage corresponding threaded openings in said flat surface for securing said flange directly to said member;

a gate valve included in said base sealing portion intermediate its first and second ends for controlling the flow of gas through said first pipe;

a stuffing box portion having a second pipe with first and second ends and an inner space, said first end of said second pipe carrying a threaded element with threads sized and pitched to cooperate with said threads carried by said first end of said first pipe;

said stuffing box portion including a release valve communicating with the inner space of said second pipe and a stuffing collar carried by said second end of said second pipe;

said stuffing collar having an axial opening therethrough with a first diameter;

an element-removal portion including a hollow outer shaft having first and second ends, a first outer diameter and a first inner diameter and a concentric inner shaft having first and second ends, and a second outer diameter, said concentric inner shaft being axially rotatable within and with respect to said hollow outer shaft;

an outer socket affixed to said first end of said hollow outer shaft and adapted to engage firmly said mounting flange of said axle box;

an inner socket fixedly carried by said first end of said concentric inner shaft for operationally engaging said rotatable axle of said axle box;

a handle carried by said second end of said concentric inner shaft and torque-application means carried by said second end of said hollow outer shaft;

said first outer diameter of said hollow outer shaft being such as to permit relative rotational but hermetically sealing engagement between said stuffing collar and said hollow outer shaft.

2. Apparatus according to claim 1 in which said outer socket has an outer diameter which exceeds said first inner diameter of said hollow outer shaft.

3. Apparatus according to claim 1 in which said outer socket includes a set screw for engaging said mounting flange of said axle box.

4. Apparatus according to claim 1 in which said inner socket is sized and shaped to engage snugly the axle of said axle box.

5. Apparatus according to claim 1 in which said outer shaft carries, fixedly, a nut for application of torsional forces to the mounting flange of an axle box to be removed.

6. Apparatus according to claim 1 in which said inner shaft is slidably carried within said outer shaft.

7. Apparatus according to claim 1 in which said inner shaft is slidably carried by said outer shaft and in which said outer socket has an internal length which is greater than the external length of said inner socket, whereby said inner socket may be retracted within said outer socket.

8. Apparatus according to claim 1 in which said flange carries a sealing ring.

9. Apparatus according to claim 1 in which said flange is rotatable with respect to said outer shaft.

10. Apparatus according to claim 1 in which said base sealing portion includes a transparent wall section;

said inner socket having an outer diameter which exceeds said first inner diameter of said hollow outer shaft;

said outer socket including a set screw for engaging said mounting flange of said axle box;

said inner socket being internally sized and shaped to engage snugly the axle of said axle box;

said outer shaft carrying, fixedly thereon, a nut for application of torsional forces to the mounting flange of an axle box to be removed when said outer shaft has engaged said mounting flange;

said inner shaft being slidably carried within said outer shaft and said outer socket having an internal length which is greater than the outer length of said inner socket;

said flange being carried rotatably by said second end of said first pipe and carrying a sealing ring; and, said base sealing portion including a transparent wall section.

* * * * *